(12) United States Patent
Regnault et al.

(10) Patent No.: US 10,509,388 B2
(45) Date of Patent: Dec. 17, 2019

(54) RESHAPING OF DEFORMED COMPONENTS FOR ASSEMBLY

(71) Applicant: BOMBARDIER INC., Dorval (CA)

(72) Inventors: Laurent Regnault, Montreal (CA); Sebastien Sirois, Mirabel (CA)

(73) Assignee: C SERIES AIRCRAFT LIMITED PARTNERSHIP, Mirabel (CA)

(*) Notice: Subject to any disclaimer, the term of this patent is extended or adjusted under 35 U.S.C. 154(b) by 223 days.

(21) Appl. No.: 15/320,975

(22) PCT Filed: May 29, 2015

(86) PCT No.: PCT/IB2015/054095
§ 371 (c)(1),
(2) Date: Dec. 21, 2016

(87) PCT Pub. No.: WO2015/198174
PCT Pub. Date: Dec. 30, 2015

(65) Prior Publication Data
US 2017/0205800 A1    Jul. 20, 2017

Related U.S. Application Data

(60) Provisional application No. 62/018,047, filed on Jun. 27, 2014.

(51) Int. Cl.
G05B 19/402    (2006.01)
B64F 5/10    (2017.01)

(52) U.S. Cl.
CPC ............. *G05B 19/402* (2013.01); *B64F 5/10* (2017.01); *B23P 2700/01* (2013.01);
(Continued)

(58) Field of Classification Search
CPC .. B21D 1/12; B21D 1/14; B21D 1/145; B23P 2700/01; B64F 5/10; G05B 19/402;
(Continued)

(56) References Cited

U.S. PATENT DOCUMENTS 5,150,506 A    9/1992 Kotake et al.
5,653,005 A    8/1997 Speller, Sr. et al.
(Continued)

FOREIGN PATENT DOCUMENTS

JP    4444033    2/2006

OTHER PUBLICATIONS

Zhu Yongguo et al., "Fuselage Automatic Position and Pose Adjustment Method and Its Error Analysis", Journal of Nanjing University of Aeronautics & Astronautics, vol. 43, No. 2, Apr. 2011, abstract, China.
(Continued)

*Primary Examiner* — Michael J Huntley
(74) *Attorney, Agent, or Firm* — Norton Rose Fulbright Canada LLP

(57) ABSTRACT

There is described a method and system for reshaping a component for assembly that may have been deformed pre-assembly and post-fabrication. As-fabricated measurements are used to determine a baseline for the component and as-mounted measurements are used to determine a deformation parameter as a function of the baseline. The component may be reshaped using correction displacements applied to a positioning device of an assembly tool to which the component is mounted for assembly.

16 Claims, 9 Drawing Sheets

(52) U.S. Cl.
CPC .............. *G05B 2219/31068* (2013.01); *G05B 2219/37356* (2013.01); *G05B 2219/50062* (2013.01); *Y02P 90/04* (2015.11)

(58) Field of Classification Search
CPC .......... G05B 2219/31068; G05B 2219/37356; G05B 2219/50062; Y02P 90/04
See application file for complete search history.

(56) References Cited

U.S. PATENT DOCUMENTS

| | | | |
|---|---|---|---|
| 6,230,382 B1* | 5/2001 | Cunningham | B64F 5/10 29/407.04 |
| 6,625,866 B2 | 9/2003 | Stone et al. | |
| 7,047,614 B2 | 5/2006 | Scott et al. | |
| 7,194,326 B2 | 3/2007 | Cobb et al. | |
| 7,614,154 B2 | 11/2009 | Cobb | |
| 8,082,052 B2 | 12/2011 | Stark et al. | |
| 8,266,778 B2 | 9/2012 | Neuhaus et al. | |
| 8,302,312 B2* | 11/2012 | Stephan | B64C 1/068 29/897.2 |
| 8,439,337 B2 | 5/2013 | Kott | |
| 8,634,950 B2 | 1/2014 | Simonetti et al. | |
| 2006/0272141 A1 | 12/2006 | Rudduck et al. | |
| 2008/0300823 A1* | 12/2008 | Marsh | G01B 21/20 702/152 |
| 2009/0112348 A1* | 4/2009 | Jones | B64F 5/10 700/114 |
| 2009/0112349 A1* | 4/2009 | Cobb | B64F 5/10 700/114 |
| 2010/0049354 A1* | 2/2010 | Stark | G01S 17/87 700/110 |
| 2011/0036946 A1* | 2/2011 | Depeige | B64C 1/18 244/120 |
| 2011/0190941 A1* | 8/2011 | Marsh | B64F 5/60 700/275 |
| 2011/0282483 A1* | 11/2011 | Simonetti | G05B 19/402 700/114 |
| 2012/0130528 A1 | 5/2012 | Stark et al. | |
| 2014/0288695 A1 | 9/2014 | Meissner et al. | |
| 2014/0288895 A1* | 9/2014 | Fricero | G05B 19/4097 703/1 |
| 2014/0325813 A1* | 11/2014 | Batt | B23P 13/00 29/428 |
| 2014/0353894 A1* | 12/2014 | DesJardien | B23P 19/10 269/21 |
| 2016/0074926 A1* | 3/2016 | Hunt | B29C 70/00 72/19.6 |

OTHER PUBLICATIONS

ORMEC Productivity in Motion, Airframe Assembly, ORMEC Systems Corp., Application Aerospace/Military, www.ormec.com, U.S.
"Aircraft Assembly Technology: Fully Automatic Measurement of Fuselage Shells", Innovations, Durr Global, www.durr.com, 2014.
J. Wollnack et al., "Form Correction, Positioning and Orientation Guidance for Flexible and Automated Assembly of Large Components", wt Werkstattstechnik online Jahrgang, vol. 94, No. 9, 2004, pp. 414-421, Germany.
Mtorres, "Total Solution for Aircraft Automatic Assembly Jigs", 19 pages.
Gary Williams et al., "Automated Positioning and Alignment Systems", Advance Integration Technology, Inc., Society of Automotive Engineers, Inc., 2000, 9 pages.
International Search Report and Written Opinion dated Dec. 4, 2015 in connection with International Patent Application No. PCT/IB2015/054095.
European Patent Office, Communication pursuant to Article 94(3) EPC dated Feb. 9, 2018 re: EP patent application No. 15 730 283.7.

* cited by examiner

RESHAPING OF DEFORMED COMPONENTS FOR ASSEMBLY

CROSS-REFERENCE TO RELATED APPLICATIONS

This application claims priority under 35 U.S.C. 119(e) to U.S. application No. 62/018,047 filed Jun. 27, 2014, entitled "Reshaping Of Deformed Components For Assembly", the entire contents of which are hereby incorporated by reference.

TECHNICAL FIELD

The present invention relates to the field of component assembly and more particularly, to the assembly of components subjected to potential deformation prior to a final assembly stage.

BACKGROUND OF THE ART

Fuselage sections are often deformed when arriving to a final stage of an assembly process. The deformation usually consists of a distortion of a floor structure such that it is no longer straight. This warping or twisting of the component may occur during transport from the supplier to the assembly location. It may also occur as the component is placed on an assembly tool during the assembly process.

If ignored, using deformed components may lead to misalignments with other components and thus less aerodynamically-efficient aircraft. Special support structures may be constructed to ensure that a mounted component regains its initial shape, but this adds costs to the assembly process as it requires custom-made supports for each component. Manual reshaping procedures may be used before assembly to reshape deformed components, but this adds manpower and time to the assembly process.

SUMMARY

There is described herein a method and system for reshaping a component for assembly that may have been deformed pre-assembly and post-fabrication. As-fabricated measurements are used to determine a baseline for the component and as-mounted measurements are used to determine a deformation parameter as a function of the baseline. The component may be reshaped using correction displacements applied to a positioning device of an assembly tool to which the component is mounted for assembly.

In accordance with a first broad aspect, there is provided a computer-implemented method for reshaping a component mounted on an assembly tool having a positioning device. The method comprises receiving a set of as-fabricated measurements of the component; receiving a set of as-mounted measurements of the component, the as-mounted measurements taken at a same position on the component as the as-fabricated measurements; determining a deformation parameter for the component based on the as-placed measurements and the as-fabricated measurements; determining a set of correction displacements for the positioning device to reshape the component using the deformation parameter; and generating control signals for applying the correction displacements to the positioning device.

In some embodiments, receiving a set of as-fabricated measurements comprises receiving a first pair of measurements reflecting a position of a first pair of pre-established points located at a first end of the component and a second pair of measurements reflecting a position of a second pair of pre-established points located at a second end of the component opposite to the first end; and receiving a set of as-mounted measurements comprises receiving a third pair of measurements reflecting the position of the first pair of pre-established points from the first end of the component and a fourth pair of measurements reflecting the position of the second pair of pre-established points of the second end of the component.

In some embodiments, the first pair of pre-established points and the second pair of pre-established points are on a floor structure of the component.

In some embodiments, the method further comprises determining a baseline for a shape of the component based on the as-fabricated measurements.

In some embodiments, determining the deformation parameter comprises determining the deformation parameter based on the as-mounted measurements and the baseline.

In some embodiments, determining a baseline comprises calculating an initial twist angle for the floor structure by adding a first angle formed between the first pair of measurements and a horizontal plane to a second angle formed between the second pair of measurements and the horizontal plane.

In some embodiments, determining a deformation parameter comprises calculating an actual twist angle by adding a third angle formed between the third pair of measurements and the horizontal plane and a fourth angle formed between the fourth pair of measurements and the horizontal plane to obtain a sum, and subtracting the sum from the initial twist angle.

In some embodiments, determining a set of correction displacements comprises defining a rotation point on the component, selecting one end of the component to remain fixed, and determining displacements in x, y, and z for another end of the component about the rotation point.

In some embodiments, defining a rotation point comprises selecting a center point between one of the third pair of measurements and the fourth pair of measurements as the rotation point.

In some embodiments, determining displacements in x, y, and z comprises determining displacements for at least two separate actuators of the positioning device.

In some embodiments, generating control signals comprises generating vertical displacement signals and using a weight of the component combined with the vertical displacement signals to reshape the component.

In some embodiments, generating control signals comprises combining correction displacements with assembly displacements of the positioning device to perform reshaping and assembly concurrently.

In some embodiments, generating control signals comprises comparing the correction displacements to a correction threshold and generating the control signals when the correction threshold is exceeded.

In some embodiments, the method also comprises receiving updated as-mounted measurements of the component after the control signals have been applied to the positioning device; determining an updated deformation parameter based on the updated as-mounted measurements and the as-fabricated measurements; determining updated correction displacements based on the updated deformation parameter; comparing the updated correction displacements to the correction threshold; and generating updated control signals when the correction threshold is exceeded.

In some embodiments, the method also comprises repeating steps of receiving updated as-mounted measurements, determining an updated deformation parameter, determining updated correction displacements, comparing the updated correction displacements to the correction threshold, and generating updated control signals until the updated correction displacements fall below the correction threshold.

In accordance with another broad aspect, there is provided computer-implemented method for generating a set of correction displacements to reshape a component. The method comprises receiving a set of as-fabricated measurements of the component; receiving a set of as-mounted measurements of the component, the as-mounted measurements taken at a same position on the component as the as-fabricated measurements; determining a deformation parameter for the component based on the as-mounted measurements and the as-fabricated measurements; determining the set of correction displacements based on the deformation parameter to reshape the component; and outputting the correction displacements.

In some embodiments, receiving a set of as-fabricated measurements comprises receiving a first pair of measurements reflecting a position of a first pair of pre-established points located at a first end of the component and a second pair of measurements reflecting a position of a second pair of pre-established points located at a second end of the component opposite to the first end; and receiving a set of as-mounted measurements comprises receiving a third pair of measurements reflecting the position of the first pair of pre-established points from the first end of the component and a fourth pair of measurements reflecting the position of the second pair of pre-established points of the second end of the component. The first pair of pre-established points and the second pair of pre-established points may be on a floor structure of the component.

In some embodiments, the method further comprises determining a baseline for a shape of the component based on the as-fabricated measurements. Determining the deformation parameter may comprise determining the deformation parameter based on the as-mounted measurements and the baseline. Determining a baseline may comprise calculating an initial twist angle for the floor structure by adding a first angle formed between the first pair of measurements and a horizontal plane to a second angle formed between the second pair of measurements and the horizontal plane. Determining a deformation parameter may comprise calculating an actual twist angle by adding a third angle formed between the third pair of measurements and the horizontal plane and a fourth angle formed between the fourth pair of measurements and the horizontal plane to obtain a sum, and subtracting the sum from the initial twist angle.

In some embodiments, determining a set of correction displacements comprises defining a rotation point on the component, selecting one end of the component to remain fixed, and determining displacements in x, y, and z for another end of the component about the rotation point. Defining a rotation point may comprise selecting a center point between one of the third pair of measurements and the fourth pair of measurements as the rotation point. Determining displacements in x, y, and z may comprise determining displacements for at least two separate actuators of the positioning device.

In accordance with another broad aspect, there is provided a system for reshaping a component mounted on an assembly tool having a positioning device. The system comprises a memory; a processor coupled to the memory; and at least one application stored in the memory and executable by the processor. The application is executable for receiving a set of as-fabricated measurements of the component; receiving a set of as-mounted measurements of the component, the as-placed measurements taken at a same position on the component as the as-fabricated measurements; determining a deformation parameter for the component based on the as-placed measurements and the as-fabricated measurements; determining a set of correction displacements for the positioning device to reshape the component using the deformation parameter; and generating control signals for applying the correction displacements to the positioning device.

In some embodiments, receiving a set of as-fabricated measurements comprises receiving a first pair of measurements reflecting a position of a first pair of pre-established points located at a first end of the component and a second pair of measurements reflecting a position of a second pair of pre-established points located at a second end of the component opposite to the first end; and receiving a set of as-mounted measurements comprises receiving a third pair of measurements reflecting the position of the first pair of pre-established points from the first end of the component and a fourth pair of measurements reflecting the position of the second pair of pre-established points of the second end of the component. The first pair of pre-established points and the second pair of pre-established points may be on a floor structure of the component.

In some embodiments, the application is further executable for determining a baseline for a shape of the component based on the as-fabricated measurements. Determining the deformation parameter may comprise determining the deformation parameter based on the as-mounted measurements and the baseline. Determining a baseline may comprise calculating an initial twist angle for the floor structure by adding a first angle formed between the first pair of measurements and a horizontal plane to a second angle formed between the second pair of measurements and the horizontal plane. Determining a deformation parameter may comprise calculating an actual twist angle by adding a third angle formed between the third pair of measurements and the horizontal plane and a fourth angle formed between the fourth pair of measurements and the horizontal plane to obtain a sum, and subtracting the sum from the initial twist angle.

In some embodiments, determining a set of correction displacements comprises defining a rotation point on the component, selecting one end of the component to remain fixed, and determining displacements in x, y, and z for another end of the component about the rotation point. Defining a rotation point may comprise selecting a center point between one of the third pair of measurements and the fourth pair of measurements as the rotation point. Determining displacements in x, y, and z may comprise determining displacements for at least two separate actuators of the positioning device.

In some embodiments, generating control signals comprises generating vertical displacement signals and using a weight of the component combined with the vertical displacement signals to reshape the component.

In some embodiments, generating control signals comprises combining correction displacements with assembly displacements of the positioning device to perform reshaping and assembly concurrently.

In some embodiments, generating control signals comprises comparing the correction displacements to a correction threshold and generating the control signals when the correction threshold is exceeded.

In some embodiments, the application is further executable for receiving updated as-mounted measurements of the component after the control signals have been applied to the positioning device; determining an updated deformation parameter based on the updated as-mounted measurements and the as-fabricated measurements; determining updated correction displacements based on the updated deformation parameter; comparing the updated correction displacements to the correction threshold; and generating updated control signals when the correction threshold is exceeded.

In some embodiments, the application is further executable for repeating steps of receiving updated as-mounted measurements, determining an updated deformation parameter, determining updated correction displacements, comparing the updated correction displacements to the correction threshold, and generating updated control signals until the updated correction displacements fall below the correction threshold.

In accordance with another broad aspect, there is provided a system for determining a set of correction displacements to reshape a component. The system comprises a memory; a processor coupled to the memory; and at least one application stored in the memory and executable by the processor. The application is executable for receiving a set of as-fabricated measurements of the component; receiving a set of as-mounted measurements of the component, the as-mounted measurements taken at a same position on the component as the as-fabricated measurements; determining a deformation parameter for the component based on the as-mounted measurements and the as-fabricated measurements; and determining the set of correction displacements based on the deformation parameter to reshape the component.

In accordance with yet another broad aspect, there is provided a computer readable medium having stored thereon program code executable by a processor for reshaping a component mounted to an assembly tool having a positioning device. The program code is executable for: receiving a set of as-fabricated measurements of the component; receiving a set of as-mounted measurements of the component, the as-placed measurements taken at a same position on the component as the as-fabricated measurements; determining a deformation parameter for the component based on the as-placed measurements and the as-fabricated measurements; determining a set of correction displacements for the positioning device to reshape the component using the deformation parameter; and generating control signals for applying the correction displacements to the positioning device.

In accordance with another broad aspect, there is provided a computer readable medium having stored thereon program code executable by a processor for determining a set of correction displacements to reshape a component. The program code is executable for receiving a set of as-fabricated measurements of the component; receiving a set of as-mounted measurements of the component, the as-mounted measurements taken at a same position on the component as the as-fabricated measurements; determining a deformation parameter for the component based on the as-mounted measurements and the as-fabricated measurements; determining the set of correction displacements based on the deformation parameter to reshape the component; and outputting the correction displacements.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION

Figure 1:
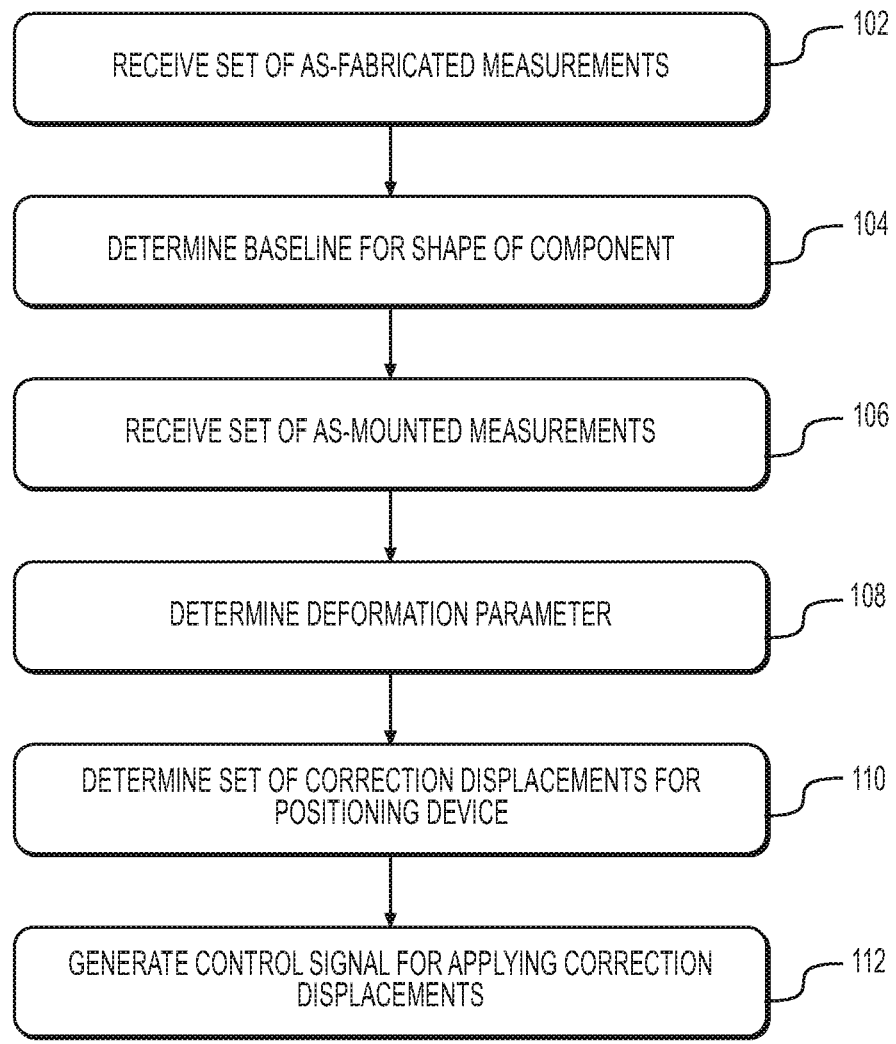
FIG. 1 is a flowchart of an exemplary computer-implemented method for reshaping a component mounted to an assembly tool.

There is illustrated in FIG. 1 a computer-implemented method for reshaping a component mounted to an assembly tool having a positioning device. The expression "mounted" should be understood to mean placed on the assembly tool, with or without any attachment means. The assembly tool may be one of many various tools from a plurality of industries, such as aerospace, industrial, automobile; and others where products are fabricated by assembling together two or more components having been manufactured separately. In some examples, the components are themselves sub-assemblies for assembling with other sub-assemblies and/or single components. The positioning device is used for automatically aligning and joining the various components and/or sub-assemblies together once mounted on the assembly tool. The positioning device may be incorporated inside the assembly tool or may be provided separately therefrom.

Components may have been deformed at various stages of the assembly process, anywhere from post-fabrication to final assembly. It should be understood that a deformation refers to a change to the component from an as-fabricated shape and not from a nominal shape. Any imperfections resulting from fabrication are not considered to be deformations and are thus not corrected for using the present method and system. Therefore, as-fabricated measurements are taken on the component immediately post-fabrication in order to obtain measurements that truly reflect the shape of the component as-fabricated and before any potential deformations. Such measurements may be obtained using any known measurement techniques, manual or automated. For example, measuring sensors may be provided directly on a fabrication apparatus to record readings as the component is manufactured, a fabricated component may be provided to a 3D measuring device to record readings post-fabrication, or a portable measuring device such as a laser tracker may be used to record measurements. The measurements themselves may be used to create a reference system in order to orient the component in space. Alternatively, a predetermined reference system is used and the measurements are expressed in accordance with the reference system.

Referring to FIG. 1, in a first step 102, the set of as-fabricated measurements are received by a component reshaping system. The as-fabricated measurements may be used to determine a baseline for the shape of the component 104. The baseline should be understood to refer to a reference shape or a reference parameter of the component. Once the component is ready for assembly, it is placed on the assembly tool. Once placed on the assembly tool, the component may be secured to the tooling via attachment means and/or be disposed on contact surfaces defined by the assembly tooling. In the latter instance, the component may be held in place on the assembly tooling by its own weight. As-mounted measurements of the component are obtained while the component is on the assembly tool, before assembly. The component may or may not be attached to the tool to obtain the as-mounted measurements. The as-mounted measurements may be expressed in the same reference system as the as-fabricated measurements and are taken at the same points on the component as the as-fabricated measurements. Alternatively, the measurements may be taken in different reference systems in which case an additional step of converting one of the as-fabricated measurements and the as-mounted measurements into a common reference system may be undertaken. The as-mounted measurements may be obtained using any known manual or automated measurement technique. They may also be obtained using a measurement system integrated directly into the assembly tool.

The as-mounted measurements are received by the system 106 and used with the baseline to determine a deformation parameter 108. The deformation parameter corresponds to any characteristic, feature, or measurable factor that may be used to quantify the deformation of the component compared to its as-fabricated shape. The deformation parameter may thus be expressed in a variety of forms, such as a set of coordinates for a point on the component as-mounted whereby the position (0, 0, 0) represents the same point on the component as-fabricated, pre-deformation. Alternatively, the deformation parameter may correspond to an angle that represents a twist or torsion of the component when it underwent deformation. Those skilled in the art will recognize other forms of expression for the deformation parameter. In an alternative embodiment, the deformation parameter may be determined by comparing the as-fabricated measurements to the as-mounted measurements without undertaking the intermediary step of determining a baseline from the as-fabricated measurements.

Once the deformation parameter has been determined, a set of correction displacements are determined 110 such that the positioning device may reshape the component to its as-fabricated shape. The correction displacements are then used to generate control signals 112 for applying the correction displacements to the positioning device. The component reshaping system is thus configured to remove the deformations from the component to return it to its as-fabricated shape while the component is mounted on the assembly tool.

Figure 2:
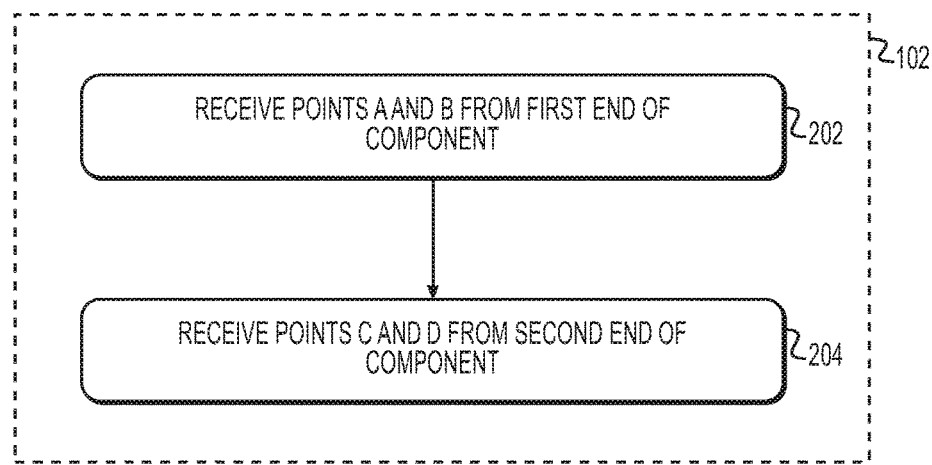
FIG. 2 is a flowchart of an exemplary method for receiving a set of as-fabricated measurements.

Turning to FIG. 2, there is illustrated an exemplary embodiment for receiving the set of as-fabricated measurements of the component 102. In this example, the as-fabricated measurements comprise a first pair of measurements corresponding to points A and B 202. Points A and B may be taken from a floor structure of the component at a first end thereof. For example, if the component is a forward fuselage section of an aircraft, points A and B are taken from the front end of the floor of the fuselage section. The as-fabricated measurements also comprise a second pair of measurements corresponding to points C an D 204, taken from an opposite end of the component. Using the same example, points C and D may be taken from the aft end of the floor of the fuselage section. It is understood that other points taken at different locations of the fuselage section may be used without departing from the scope of the present invention.

Figure 3:
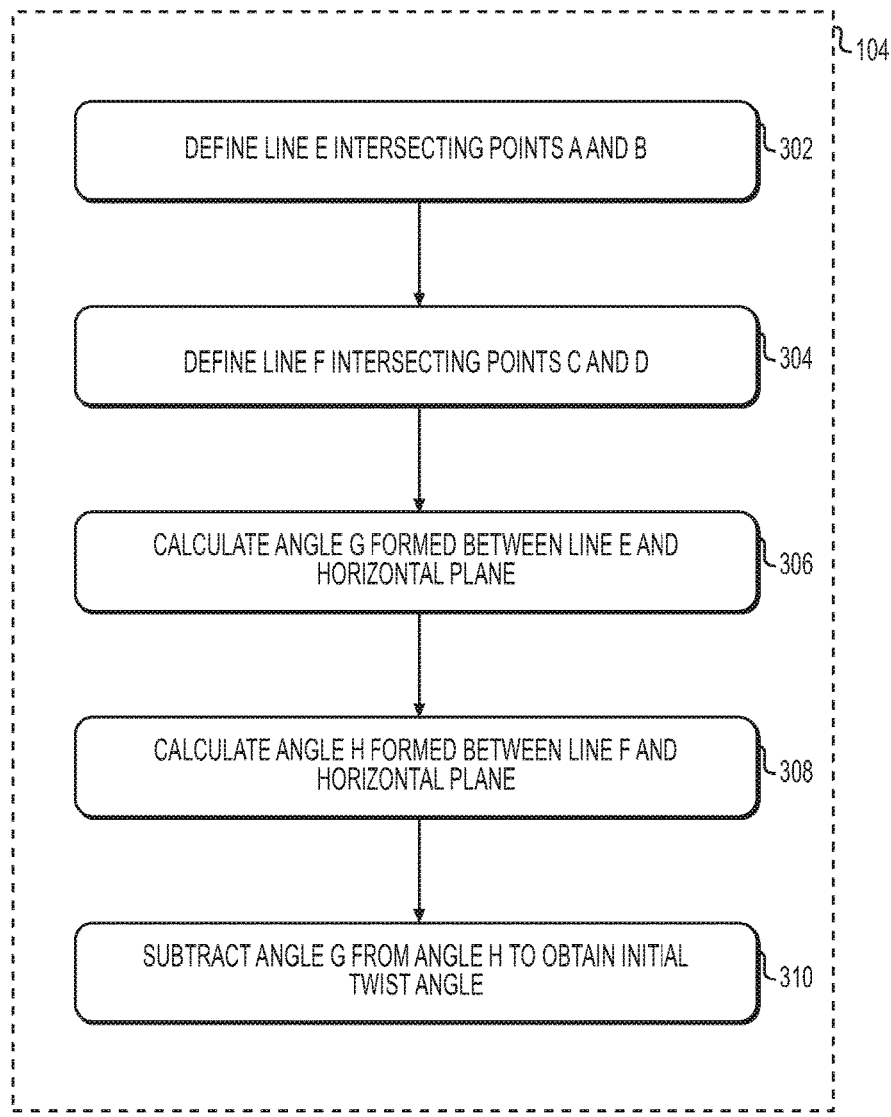
FIG. 3 is a flowchart of an exemplary method for determining a baseline for a shape of the component.

FIG. 3 illustrates an exemplary embodiment for determining the baseline 104 using the as-fabricated measurements as per the example of FIG. 2. In this example, the baseline is expressed as an initial twist angle for the component and is obtained by subtracting a first angle formed between the first pair of measurements and a horizontal plane to a second angle formed between the second pair of measurements and the horizontal plane. A line E intersecting points A and B 302 is defined. A line F intersecting points C and D 304 is defined. An angle G, formed between line E and the horizontal plane, is calculated 306. An angle H, formed between line F and the same horizontal plane, is also calculated 308. The initial twist angle is obtained by subtracting angle G from angle H 310. Alternatively, the initial twist angle may correspond to the sum between angles G and H. This is the initial condition of the component pre-deformation, the one the component reshaping system will seek to return a deformed component to.

Figure 4:
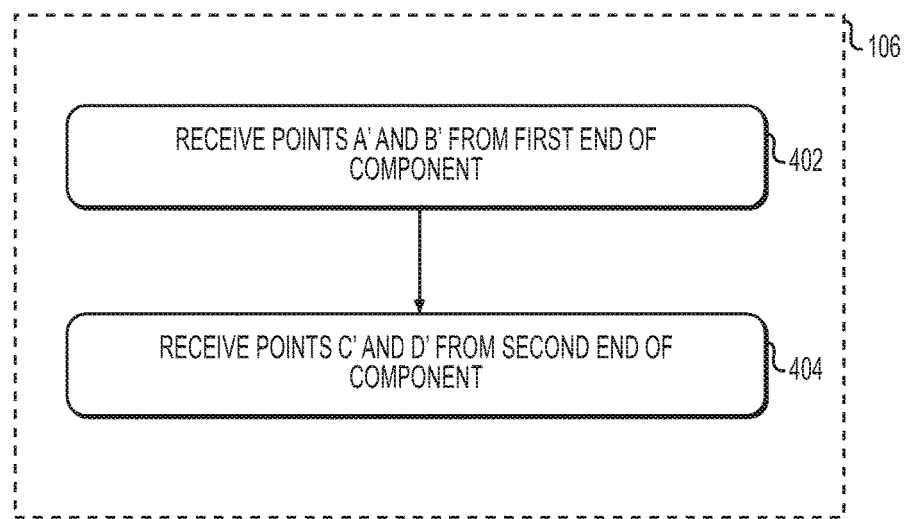
FIG. 4 is a flowchart of an exemplary method for receiving a set of as-fabricated measurements.

As per FIG. 4, an exemplary embodiment for the reception of the as-mounted measurements 106 comprises points A' and B' 402, taken at the same position as points A and B on the component once the component has been placed on the assembly tool and thus, potentially deformed. Similarly, points C' and D' are also received 404 and correspond to points C and D on the component once the component has been placed on the assembly tool.

Figure 5:
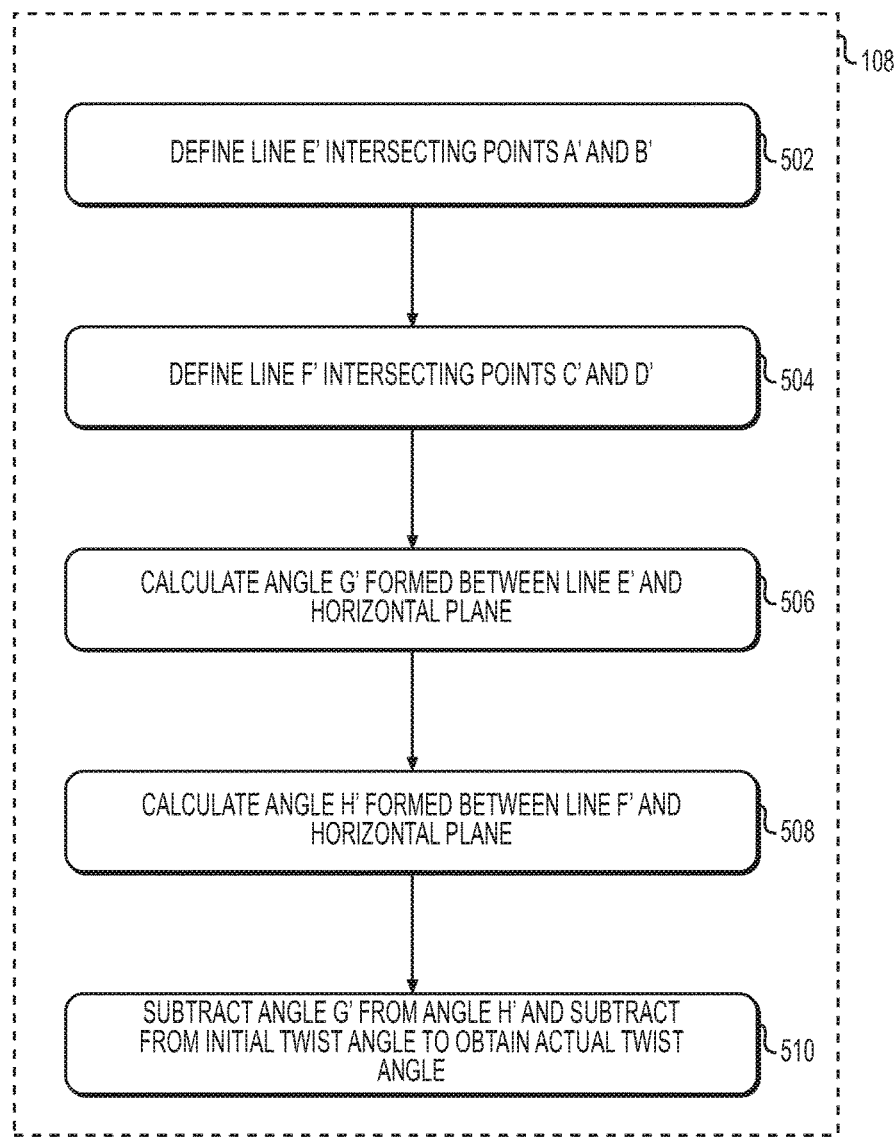
FIG. 5 is a flowchart of an exemplary method for determining a deformation parameter.

FIG. 5 is an exemplary embodiment for the determination of the deformation parameter 108. In this example, the deformation parameter is expressed as an actual twist angle and is obtained by subtracting a third angle formed between the third pair of measurements and the horizontal plane from a fourth angle formed between the fourth pair of measurements and the horizontal plane, and subtracting the difference from the initial twist angle. A line E' intersecting points A' and B' 502 is defined. A line F' intersecting points C' and D' 504 is defined. An angle G', formed between line E' and the horizontal plane, is calculated 506. An angle H', formed between line F' and the same horizontal plane, is also calculated 508. The actual twist angle is obtained by subtracting angle G' from angle H', and subtracting the difference from the initial twist angle 510. The deformation parameter, or actual twist angle, is thus expressed as the difference between the initial twist angle and a similar angle measured on the component once placed on the assembly tool.

Figure 6:
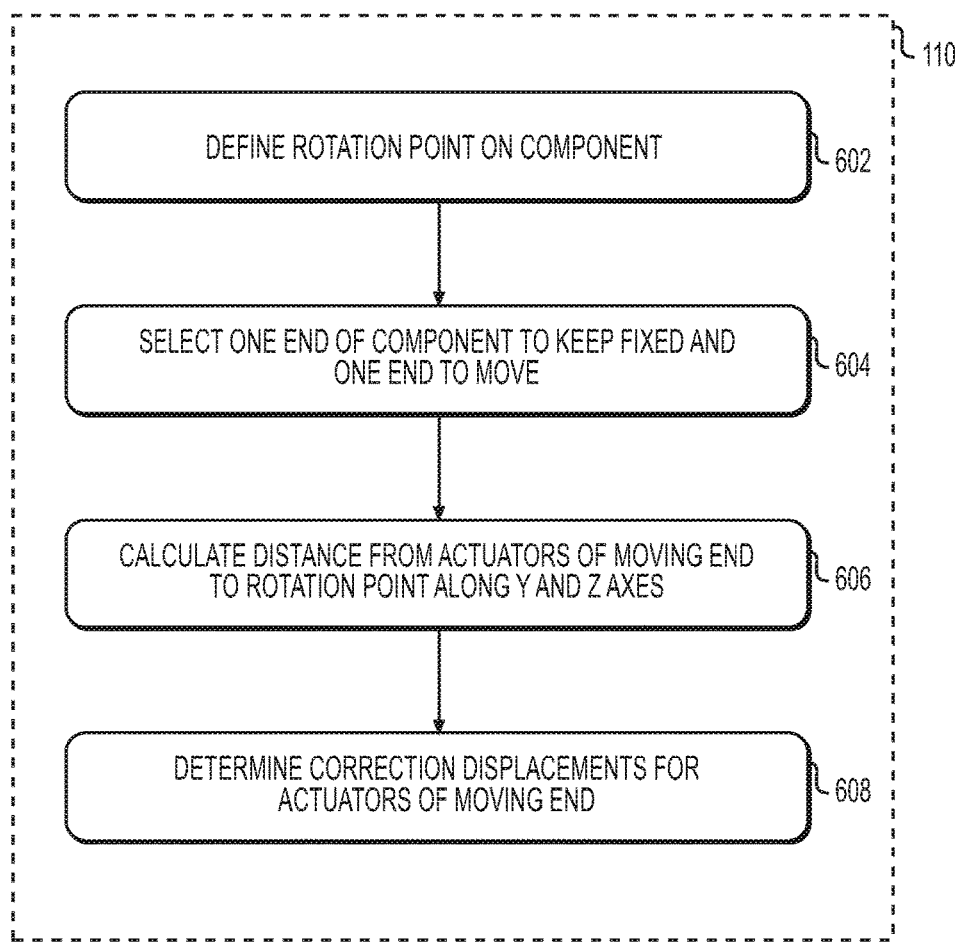
FIG. 6 is a flowchart of an exemplary method for determining a set of correction displacements.

FIG. 6 is an exemplary embodiment for determining the set of correction displacements 110 for the positioning device. The correction displacements may depend on the type of positioning device used with the assembly tool. In some embodiments, the positioning device comprises a plurality of separate actuators for manipulating the component. For example, a separate actuator may be provided for displacing the component along each one of the x, y and z axes as well as for rotating the component. In another example, four actuators may be provided, each one capable of displacing the component along the x, y, and z axes. Various other configurations for the positioning device will be readily understood by those skilled in the art.

The example of FIG. 6 is provided for a positioning device having four actuators for linear displacements and no explicit rotational mechanisms. Therefore, in order to reshape the component such that the actual twist angle is corrected to correspond to the initial twist angle, the actuators must be controlled so as to reproduce a rotational movement on the component while maintaining at least a portion of the component fixed. A rotation point is defined on the component 602. In some embodiments, the rotation point may correspond to a point positioned substantially in the center of line E' or F', between points A' and B' or C' and D', respectively. For the forward fuselage section, the point located on line F' may be selected. As a function of the rotation point, one end of the component is selected to remain fixed while the other end of the component will be displaced 604 via the actuators. The distance from each one of the two actuators controlling the displaceable end of the component to the rotation point is calculated along the y and z axes 606. The correction displacements may then be determined using the rotation point, the actual twist angle, and the distances from the rotation points to the actuators 608.

Once the correction displacements determined 110, the control signals for the positioning device are generated 112. In some embodiments, only vertical displacement signals are generated. Rotation of the component is then obtained by combining the vertical displacements (i.e. along the z axis) with gravitational forces acting on the component due to its weight. This technique may be used to avoid having the component slide on the assembly tool without regaining its original shape.

In some embodiments, a correction threshold is provided, whereby correction displacements below this threshold do not need to be applied. The correction threshold may be used by the system to determine whether control signals need to be generated to reshape the component, and control signals are only generated when the correction threshold is exceeded. In some embodiments, a feedback loop is provided for the reshaping procedure. For example, a deformation parameter is determined, correction displacements are generated, a first set of control signals are generated and applied, and an updated deformation parameter is determined. Updated correction displacements are generated and compared to the correction threshold. If the correction threshold is exceeded, a second set of control signals are generated as a function of the updated correction displacements. These steps may be repeated until correction displacements are generated that fall below the correction threshold, or until the deformation parameter is found to be smaller than a predetermined value.

In some embodiments, the component is reshaped once mounted to the assembly tool before proceeding with assembly. Alternatively, assembly and reshaping may be done concurrently by combining the correction displacements with assembly displacements used for component assembly. The control signals may thus be generated as a single set of instructions that will assemble the component with other components and/or sub-assemblies while applying the required corrections to reshape the component.

Figure 7:
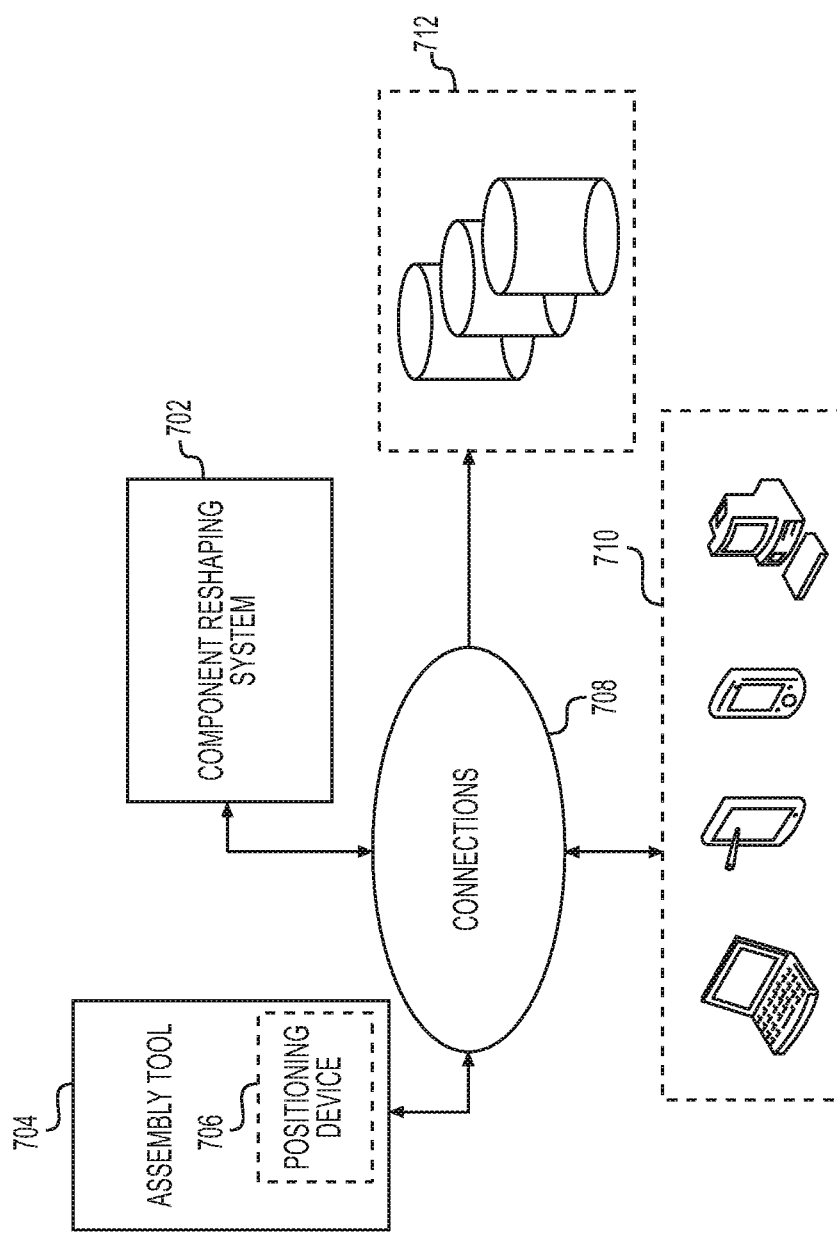
FIG. 7 is a schematic of an exemplary set-up for a component reshaping system operatively coupled to an assembly tool.

Turning to FIG. 7, there is illustrated a component reshaping system 702 operatively connected to an assembly tool 704 having a positioning device 706. As previously stated, the positioning device 706 may be provided separately from or incorporated within the assembly tool 704. Although illustrated as being separate and remote from the assembly tool 704 and positioning device 706, the component reshaping system 702 may also be integrated with the assembly tool 704 and/or positioning device 706, either as a downloaded software application, a firmware application, or a combination thereof.

Various types of connections 708 may be provided to allow the component reshaping system 702 to communicate with the positioning device 706. For example, the connections 708 may comprise wire-based technology, such as electrical wires or cables, and/or optical fibers. The connections 708 may also be wireless, such as RF, infrared, W-Fi, Bluetooth, and others. Connections 708 may therefore comprise a network, such as the Internet, the Public Switch Telephone Network (PSTN), a cellular network, or others known to those skilled in the art. Communication over the network may occur using any known communication protocols that enable devices within a computer network to exchange information. Examples of protocols are as follows: IP (Internet Protocol), UDP (User Datagram Protocol), TCP (Transmission Control Protocol), DHCP (Dynamic Host Configuration Protocol), HTTP (Hypertext Transfer Protocol), FTP (File Transfer Protocol), Telnet (Telnet Remote Protocol), SSH (Secure Shell Remote Protocol).

The component reshaping system 702 may be accessible remotely from any one of a plurality of devices 710 over connections 708. The devices 710 may comprise any device, such as a personal computer, a tablet, a smart phone, or the like, which is configured to communicate over the connections 708. In some embodiments, the component reshaping system may itself be provided directly on one of the devices 710, either as a downloaded software application, a firmware application, or a combination thereof.

One or more databases 712 may be integrated directly into the component reshaping system 702 or any one of the devices 710, or may be provided separately therefrom (as illustrated). In the case of a remote access to the databases 712, access may occur via connections 708 taking the form of any type of network, as indicated above. The various databases 712 described herein may be provided as collections of data or information organized for rapid search and retrieval by a computer. The databases 712 may be structured to facilitate storage, retrieval, modification, and deletion of data in conjunction with various data-processing operations. The databases 712 may be any organization of data on a data storage medium, such as one or more servers. The databases 712 illustratively have stored therein any one of as-fabricated measurements, as-mounted measurements, component baselines, component deformation parameters, correction displacements, correction thresholds, and assembly displacements.

Figure 8:
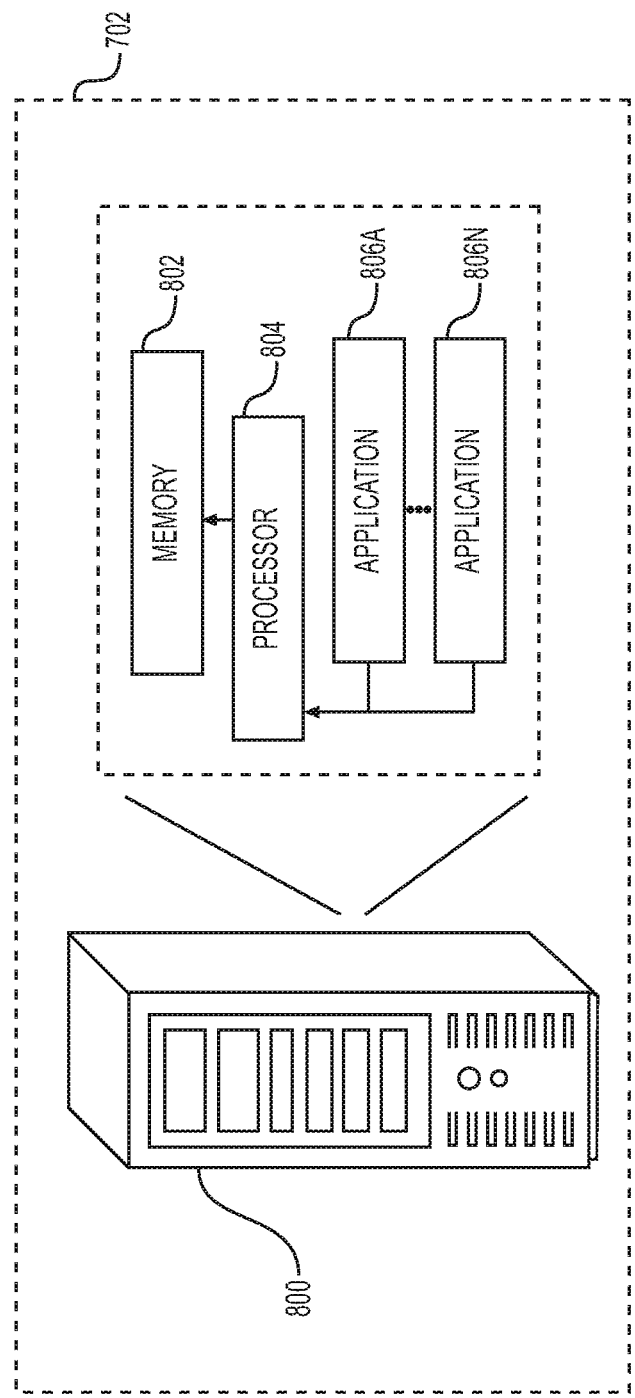
FIG. 8 is a block diagram of an exemplary component reshaping system.

As shown in FIG. 8, the component reshaping system 702 illustratively comprises one or more server(s) 800. For example, a series of servers corresponding to a web server, an application server, and a database server may be used. These servers are all represented by server 800 in FIG. 8. The server 800 may be accessed by a user, such as a technician or an assembly line worker, using one of the devices 710, or directly on the system 702 via a graphical user interface. The server 800 may comprise, amongst other things, a plurality of applications $806a \ldots 806n$ running on a processor 804 coupled to a memory 802. It should be understood that while the applications $806a \ldots 806n$ presented herein are illustrated and described as separate entities, they may be combined or separated in a variety of ways.

The memory 802 accessible by the processor 804 may receive and store data. The memory 802 may be a main memory, such as a high speed Random Access Memory (RAM), or an auxiliary storage unit, such as a hard disk, a floppy disk, or a magnetic tape drive. The memory 802 may be any other type of memory, such as a Read-Only Memory (ROM), or optical storage media such as a videodisc and a compact disc. The processor 804 may access the memory 802 to retrieve data. The processor 804 may be any device that can perform operations on data. Examples are a central processing unit (CPU), a front-end processor, a microprocessor, and a network processor. The applications 806a . . . 806n are coupled to the processor 804 and configured to perform various tasks. An output may be transmitted to the positioning device 706 and/or to the devices 710.

Figure 9:
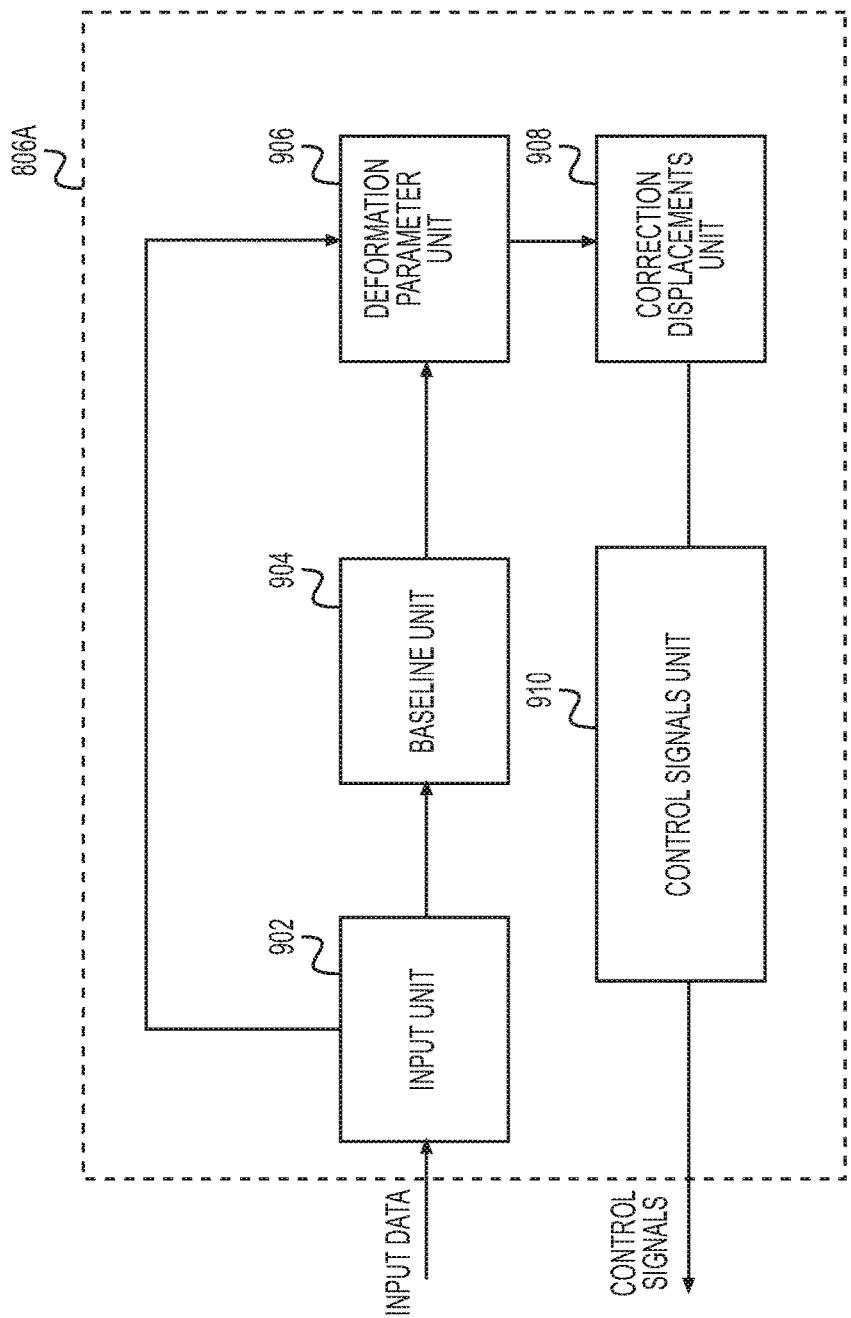
FIG. 9 is a block diagram of an exemplary application running on the processor of the component reshaping system of FIG. 8.

FIG. 9 is an exemplary embodiment of an application 806a running on the processor 804. The application 806a illustratively comprises an input unit 902, a baseline unit 904, a deformation parameter unit 906, a correction displacements unit 908, and a control signals unit 910. The input unit 902 illustratively receives input from a measuring device or manually as entered by a user. The input may comprise the as-fabricated measurements and the as-mounted measurements. For the purpose of inputting data manually, an interface presented to a user, on his/her device 710 may be used as an input means. For example, a graphical user interface comprising a plurality of user interface control elements, such as text boxes, electronic forms, drop-down boxes and menus (not shown), may be displayed on a screen of the device 710. It should however be understood that any suitable input device, such as a keyboard, a mouse, a microphone, or the like, may also be used to enter information into the system 702. Any input received from the user may be received and stored in the memory 802 and/or databases 712 for future reference. Although the application 806a is represented as comprising the input unit 902, the baseline unit 904, the deformation parameter unit 906, the correction displacements unit 908, and the control signals unit 910, it is understood that other configurations are also possible and that the input unit 902, the baseline unit 904, the deformation parameter unit 906, the correction displacements unit 908, and the control signals unit 910 may be part of distinct applications running on distinct systems.

The input unit 902 is configured to receive the as-fabricated measurements 102 and receive the as-mounted measurements 106. The as-fabricated measurements are transmitted to the baseline unit 904 to determine the baseline for the shape of the component 104. The as-mounted measurements are transmitted to the deformation parameter unit 906. The baseline unit 904 also transmits the baseline to the deformation parameter unit 906, which is configured to determine the deformation parameter 108 using the as-mounted measurements and the baseline. The correction displacements unit 908 receives the deformation parameter from the deformation parameter unit 906 and determines the set of correction displacements for the positioning device 110. The correction displacements are transmitted to the control signals unit 910 and control signals are generated for applying the correction displacements to the positioning device 112.

In some embodiments, the input unit 902, baseline unit 904, deformation parameter unit 906, correction displacements unit 908, and control signals unit 910 may be configured to perform the steps as illustrated in FIGS. 2 to 6. The control signals unit 910 may further be configured to consider a correction threshold when generating the control signals, and/or to combine the correction displacements with predetermined assembly displacements to output a single set of instructions for concurrent assembly and reshaping.

The above description is meant to be exemplary only, and one skilled in the relevant arts will recognize that changes may be made to the embodiments described without departing from the scope of the invention disclosed. For example, the blocks and/or operations in the flowcharts and drawings described herein are for purposes of example only. There may be many variations to these blocks and/or operations without departing from the teachings of the present disclosure. For instance, the blocks may be performed in a differing order, or blocks may be added, deleted, or modified. While illustrated in the block diagrams as groups of discrete components communicating with each other via distinct data signal connections, it will be understood by those skilled in the art that the present embodiments are provided by a combination of hardware and software components, with some components being implemented by a given function or operation of a hardware or software system, and many of the data paths illustrated being implemented by data communication within a computer application or operating system. The structure illustrated is thus provided for efficiency of teaching the present embodiment. The present disclosure may be embodied in other specific forms without departing from the subject matter of the claims. Also, one skilled in the relevant arts will appreciate that while the systems, methods and computer readable mediums disclosed and shown herein may comprise a specific number of elements/components, the systems, methods and computer readable mediums may be modified to include additional or fewer of such elements/components. The present disclosure is also intended to cover and embrace all suitable changes in technology. Modifications which fall within the scope of the present invention will be apparent to those skilled in the art, in light of a review of this disclosure, and such modifications are intended to fall within the appended claims.

The invention claimed is:

1. A computer-implemented method for reshaping a component mounted on an assembly tool having a positioning device, the method comprising,
   receiving a set of as-fabricated measurements of the component;
   receiving a set of as-mounted measurements of the component, the as-mounted measurements taken at a same position on the component as the as-fabricated measurements;
   determining a baseline for a shape of the component based on the as-fabricated measurements by calculating an initial twist angle for a floor structure by adding a first angle formed between a first pair of measurements and a horizontal plane to a second angle formed between a second pair of measurements and the horizontal plane;
   determining a deformation parameter for the component based on the as-mounted measurements, the as-fabricated measurements, the as-mounted measurements, and the baseline;
   determining a set of correction displacements for the positioning device to reshape the component using the deformation parameter; and
   generating control signals for applying the correction displacements to the positioning device.

2. The method of claim 1, wherein determining a deformation parameter comprises calculating an actual twist angle by adding a third angle formed between the third pair of measurements and the horizontal plane and a fourth angle formed between the fourth pair of measurements and the horizontal plane to obtain a sum, and subtracting the sum from the initial twist angle.

3. The method of claim 1, wherein generating control signals comprises generating vertical displacement signals and using a weight of the component combined with the vertical displacement signals to reshape the component.

4. A computer-implemented method for reshaping a component mounted on an assembly tool having a positioning device, the method comprising:
   receiving a set of as-fabricated measurements of the component by receiving a first pair of measurements reflecting a position of a first pair of pre-established points located at a first end of the component and a second pair of measurements reflecting a position of a second pair of pre-established points located at a second end of the component opposite to the first end;
   receiving a set of as-mounted measurements of the component, by receiving a third pair of measurements reflecting the position of the first pair of pre-established points from the first end of the component and a fourth pair of measurements reflecting the position of the second pair of pre-established points of the second end of the component, the as-mounted measurements taken at a same position on the component as the as-fabricated measurements;
   determining a deformation parameter for the component based on the as-placed measurements and the as-fabricated measurements;
   determining a set of correction displacements for the positioning device to reshape the component using the deformation parameter; and
   generating control signals for applying the correction displacements to the positioning device, wherein determining a set of correction displacements comprises defining a rotation point on the component, selecting one end of the component to remain fixed, and determining displacements in x, y, and z for another end of the component about the rotation point.

5. The method of claim 4, wherein defining a rotation point comprises selecting a center point between one of the third pair of measurements and the fourth pair of measurements as the rotation point.

6. The method of claim 4, wherein determining displacements in x, y, and z comprises determining displacements for at least two separate actuators of the positioning device.

7. A computer-implemented method for reshaping a component mounted on an assembly tool having a positioning device, the method comprising:
   receiving a set of as-fabricated measurements of the component;
   receiving a set of as-mounted measurements of the component, the as-mounted measurements taken at a same position on the component as the as-fabricated measurements;
   determining a deformation parameter for the component based on the as-placed measurements and the as-fabricated measurements;
   determining a set of correction displacements for the positioning device to reshape the component using the deformation parameter; and
   generating control signals for applying the correction displacements to the positioning device, wherein generating control signals comprises combining correction displacements with assembly displacements of the positioning device to perform reshaping and assembly concurrently.

8. The method of claim 7, wherein generating control signals comprises comparing the correction displacements to a correction threshold and generating the control signals when the correction threshold is exceeded.

9. The method of claim 8, further comprising:
   receiving updated as-mounted measurements of the component after the control signals have been applied to the positioning device;
   determining an updated deformation parameter based on the updated as-mounted measurements and the as-fabricated measurements;
   determining updated correction displacements based on the updated deformation parameter;
   comparing the updated correction displacements to the correction threshold; and
   generating updated control signals when the correction threshold is exceeded.

10. The method of claim 9, further comprising repeating steps of receiving updated as-mounted measurements, determining an updated deformation parameter, determining updated correction displacements, comparing the updated correction displacements to the correction threshold, and generating updated control signals until the updated correction displacements fall below the correction threshold.

11. A system for reshaping a component mounted on an assembly tool having a positioning device, the system comprising:
    a memory;
    a processor coupled to the memory; and
    at least one application stored in the memory and executable by the processor for:
       receiving a set of as-fabricated measurements of the component;
       receiving a set of as-mounted measurements of the component, the as-mounted measurements taken at a same position on the component as the as-fabricated measurements;
       determining a baseline for a shape of the component based on the as-fabricated measurements by calculating an initial twist angle for a floor structure by adding a first angle formed between a first pair of measurements and a horizontal plane to a second angle formed between a second pair of measurements and the horizontal plane;
       determining a deformation parameter for the component based on the as-mounted measurements, the as-fabricated measurements, and the baseline;
       determining a set of correction displacements for the positioning device to reshape the component using the deformation parameter; and
       generating control signals for applying the correction displacements to the positioning device.

12. The system of claim 11, wherein determining a deformation parameter comprises calculating an actual twist angle by adding a third angle formed between the third pair of measurements and the horizontal plane and a fourth angle formed between the fourth pair of measurements and the horizontal plane to obtain a sum, and subtracting the sum from the initial twist angle.

13. A system for reshaping a component mounted on an assembly tool having a positioning device, the system comprising:
    a memory;
    a processor coupled to the memory; and
    at least one application stored in the memory and executable by the processor for
       receiving a set of as-fabricated measurements of the component by receiving a first pair of measurements reflecting a position of a first pair of pre-established points located at a first end of the component and a second pair of measurements reflecting a position of a second pair of pre-established points located at a second end of the component opposite to the first end;

receiving a set of as-mounted measurements of the component, by receiving a third pair of measurements reflecting the position of the first pair of pre-established points from the first end of the component and a fourth pair of measurements reflecting the position of the second pair of pre-established points of the second end of the component, the as-mounted measurements taken at a same position on the component as the as-fabricated measurements;

determining a deformation parameter for the component based on the as-mounted measurements and the as-fabricated measurements;

determining a set of correction displacements for the positioning device to reshape the component using the deformation parameter; and generating control signals for applying the correction displacements to the positioning device, wherein determining a set of correction displacements comprises defining a rotation point on the component, selecting one end of the component to remain fixed, and determining displacements in x, y, and z for another end of the component about the rotation point.

14. The system of claim 13, wherein defining a rotation point comprises selecting a center point between one of the third pair of measurements and the fourth pair of measurements as the rotation point.

15. The system of claim 13, wherein determining displacements in x, y, and z comprises determining displacements for at least two separate actuators of the positioning device.

16. The system of claim 13, wherein generating control signals comprises combining correction displacements with assembly displacements of the positioning device to perform reshaping and assembly concurrently.

* * * * *